(12) United States Patent
Weinberg et al.

(10) Patent No.: US 11,220,381 B2
(45) Date of Patent: Jan. 11, 2022

(54) BOTTLE SEALING AND PRESERVATION DEVICE

(71) Applicants: Morgan William Weinberg, Fairfax, VA (US); Burton Allen Miller, Washington, DC (US)

(72) Inventors: Morgan William Weinberg, Fairfax, VA (US); Burton Allen Miller, Washington, DC (US)

(*) Notice: Subject to any disclaimer, the term of this patent is extended or adjusted under 35 U.S.C. 154(b) by 233 days.

(21) Appl. No.: 16/699,599

(22) Filed: Nov. 30, 2019

(65) Prior Publication Data

US 2021/0163193 A1 Jun. 3, 2021

(51) Int. Cl.
| | | |
|---|---|---|
| *B65D 51/28* | (2006.01) | |
| *B65D 39/12* | (2006.01) | |
| *C12H 1/14* | (2006.01) | |
| *B65D 39/00* | (2006.01) | |
| *B65D 51/24* | (2006.01) | |
| *B65D 39/16* | (2006.01) | |

(52) U.S. Cl.
CPC ......... *B65D 51/28* (2013.01); *B65D 39/0064* (2013.01); *B65D 39/12* (2013.01); *B65D 39/16* (2013.01); *B65D 51/244* (2013.01); *C12H 1/14* (2013.01)

(58) Field of Classification Search
CPC ............ B65D 39/0058; B65D 39/0011; B65D 51/28; B65D 39/12; B65D 39/0064; B65D 51/244; B65D 39/16; B65D 41/28; B65D 41/58; B65D 47/121; B65D 47/141; B65D 47/245; B65D 2539/001; C12H 1/14; C12H 1/22
See application file for complete search history.

(56) References Cited

U.S. PATENT DOCUMENTS

| | | | | |
|---|---|---|---|---|
| 3,135,410 | A * | 6/1964 | Federighi | B65D 39/00 215/227 |
| 3,326,400 | A * | 6/1967 | Hamelin | B65D 51/2871 206/221 |
| 4,756,436 | A * | 7/1988 | Morita | A23L 3/3436 215/228 |
| 5,117,995 | A * | 6/1992 | Kau | B65D 39/00 116/281 |
| 8,376,161 | B2 * | 2/2013 | Golden | B65D 51/28 215/228 |
| 10,829,279 | B2 * | 11/2020 | Lutz | B65D 39/0058 |
| 2011/0252924 | A1 * | 10/2011 | Federighi | B67B 7/0423 81/3.45 |
| 2014/0216265 | A1 * | 8/2014 | Godoy Varo | C12L 11/00 99/277.1 |
| 2016/0114945 | A1 * | 4/2016 | Carsello | B65D 81/268 222/152 |

* cited by examiner

*Primary Examiner* — Kareen K Thomas

(57) ABSTRACT

The bottle-sealing and preservation device provides for the sealing of necked bottles, including those designed to hold pressure such as champagne bottles, using mechanical advantage to compress an O-ring against the inner surface of the bottle neck. The device can accommodate a wide range of bottle-neck diameters and includes a stabilizing ring that engages the bottle mouth. Optionally, the device may be fitted with a cylindrical cage in which an oxygen-scavenging sachet may be inserted to pull oxygen out of the bottle headspace, thereby preserving any remaining liquid therein that is susceptible to oxidation.

19 Claims, 6 Drawing Sheets

BOTTLE SEALING AND PRESERVATION DEVICE

FIELD OF THE INVENTION

The field of the invention relates to expansible bottle-neck closures and closures that are adapted to preserve the contents of liquid receptacles. Particularly, the present invention relates to the closure of bottles under pressure such as those containing Champagne. Additionally, the invention relates to the preservation of perishable contents such as wines and whiskeys through the scavenging of oxygen.

BACKGROUND OF THE INVENTION

Bottle closures for non-threaded bottle necks such as corks and stoppers are well known. Corks are difficult to re-insert as they expand substantially upon being pulled, especially champagne corks that must hold considerable pressure. A typical bottle of sparkling wine at room temperature has a pressure of about 90 psig, which translates to about 33 lbs of force on a cork of 0.685" in diameter—typical of a champagne cork.

Typical replacement stoppers for champagne bottles have a mechanism that swings down and engages the bottle annulus and uses wedging action or a lever to cinch the stopper down against the bottle mouth. However, variations in exterior bottle-neck geometry makes it difficult for a single device to close a wide range of bottles properly. Further, such closures typically don't work well on wine bottles where the ring or collar, similar to champagne annulus, is largely ornamental.

While champagne stoppers primarily seal against the bottle mouth, replacement wine-bottle stoppers typically seal against the inner bottle neck. The challenge is that there is no standard bottle-neck inner diameter, and wine stoppers must accommodate a wide range of diameters. The typical approach to this problem is to configure the stopper with a series of thin, flat rubber rings that flexibly conform to the bottle neck. The downside is that the fit in the bottle neck can be loose to the point where the bottle can't be laid on its side, and a loose fit also translates to a non-optimal seal. Another less-effective approach is a weighted stopper configured with a cone covered by a thin elastomer that seals at the inner edge of the bottle mouth. The seal integrity is low as the pressure on the contact area is only a function of the stopper weight, necessitating that the bottle be kept upright.

A related class of stoppers aim to preserve perishable bottle contents such as wine and whiskeys through the scavenging of oxygen by attaching a scavenger to the stopper that is affixed to a partially-consumed bottle. If the stopper seal is not tight, the scavenger won't be able to work to its full effectiveness.

OBJECTS OF THE INVENTION

It is an object of this invention to close a wide variety of bottles—those used for wines, sparkling wines, whiskeys, olive oils, and other perishable liquids—and to accommodate a wide range of inner bottle-neck diameters including screw-capped bottles that tend toward the high end of the range.

It is a further object that the seal to those bottles be tight and that the device be easily installed and removed.

It is a further object that the invention be easy to manufacture in either metal or plastic, or both.

It is a further object that the invention include a simple and effective oxygen-scavenging means.

SUMMARY OF THE INVENTION

The bottle-sealing and preservation device provides for the sealing of a bottle and optionally for the preservation of its contents.

The device is configured to seal to the inner surface of a bottle neck. By avoiding a dependency on exterior dimensions, the device can cover a wide range of bottle types and need only be concerned with one parameter—inner bottle-neck diameter. A limitation of the device is that it requires enough bottle-neck length to engage the seal, which, however, is not a concern as the predominance of target beverages used necked bottles.

The device can accommodate a wide range of inner-neck diameters: 0.685"-0.75", with the lower end of the range typical of Champagne, Prosecco, and other sparkling-wine bottles, and the upper end typical of screw-capped bottles, which are also targets for the device.

The sealing means includes a knob, a pusher ring, a grip sleeve, and an O-ring. The knob is sealably affixed to the pusher ring, which in-turn sandwich the grip sleeve. The grip sleeve is threadably attached to the knob via left-hand threads such that turning the knob to the right advances the knob away from the grip sleeve. Integral to the grip sleeve is a frustoconical wedge (or chamfer) and said O-ring is installed between the pusher ring and the frustoconical wedge.

The pusher ring being affixed to the knob advances therewith as the knob is turned causing the pusher ring to urge the O-ring up said frustoconical wedge, causing the O-ring to expand and compress against the inner surface of the bottle neck sealing thereto.

Optionally attached to the pusher ring is a cylindrical breathable cage (or mesh) in which an oxygen-scavenging sachet may be inserted. Upon pouring a glass of wine, for example, attaching the device with a fresh sachet will preserve the wine as oxygen in the bottle's headspace will be absorbed by the sachet at a substantially faster rate than any reaction with the wine.

These and other features of the present invention will become readily apparent upon further review of the following specification and drawings.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
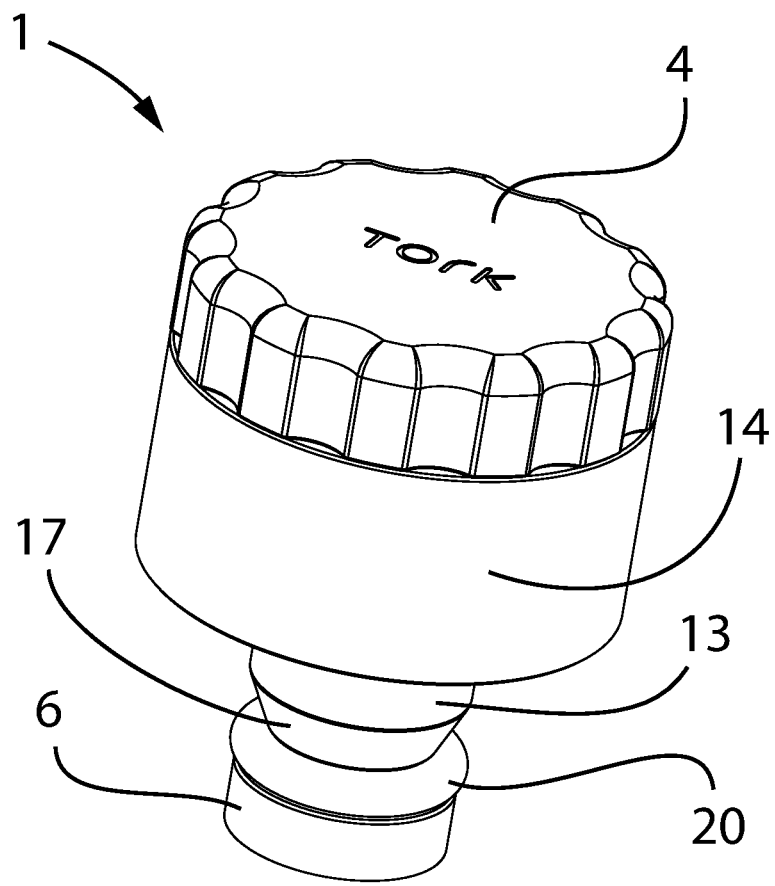
FIG. 1 is a view in perspective of a bottle-sealing device.
Figure 2:
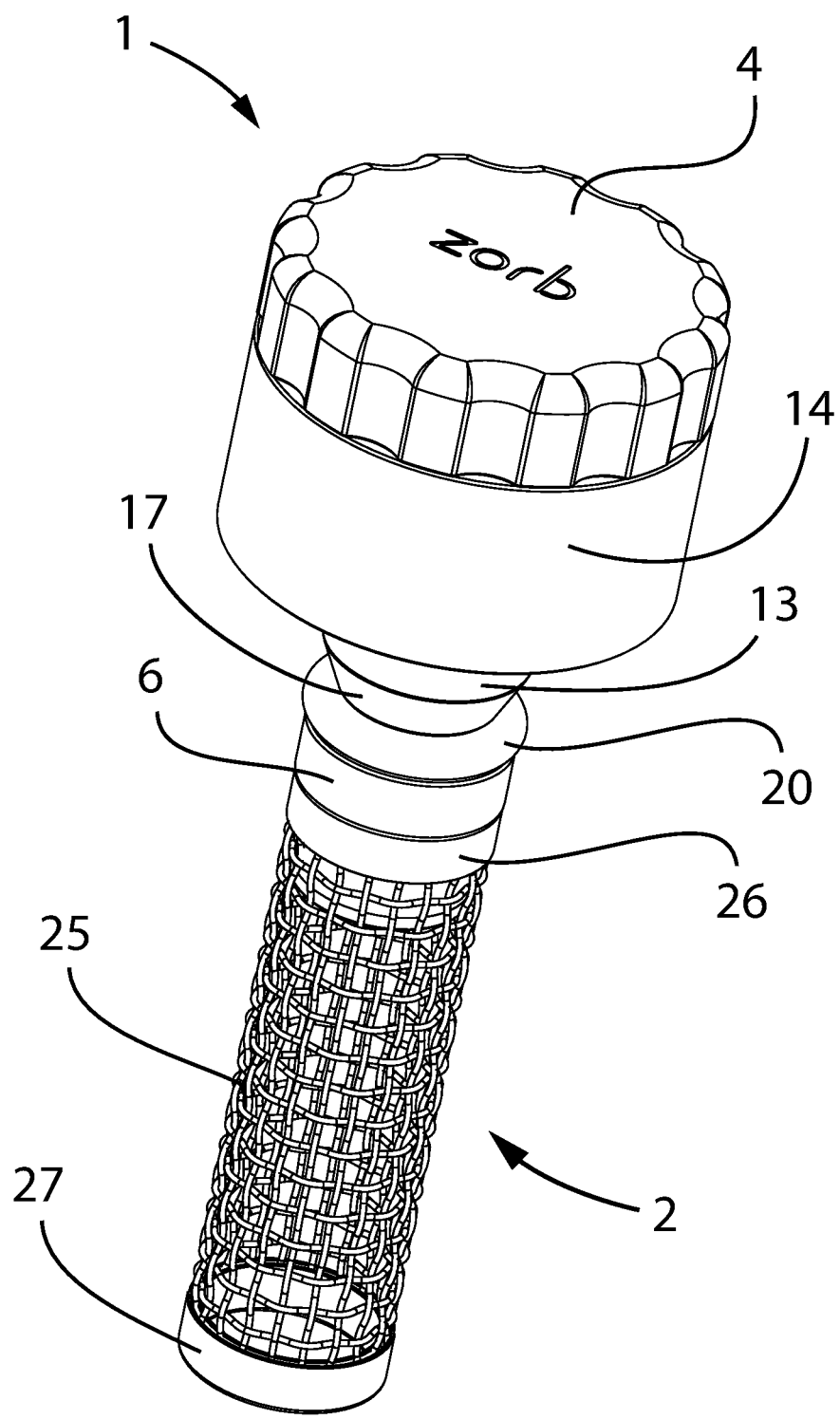
FIG. 2 is a view in perspective of a bottle-sealing and preservation device.
Figure 3:
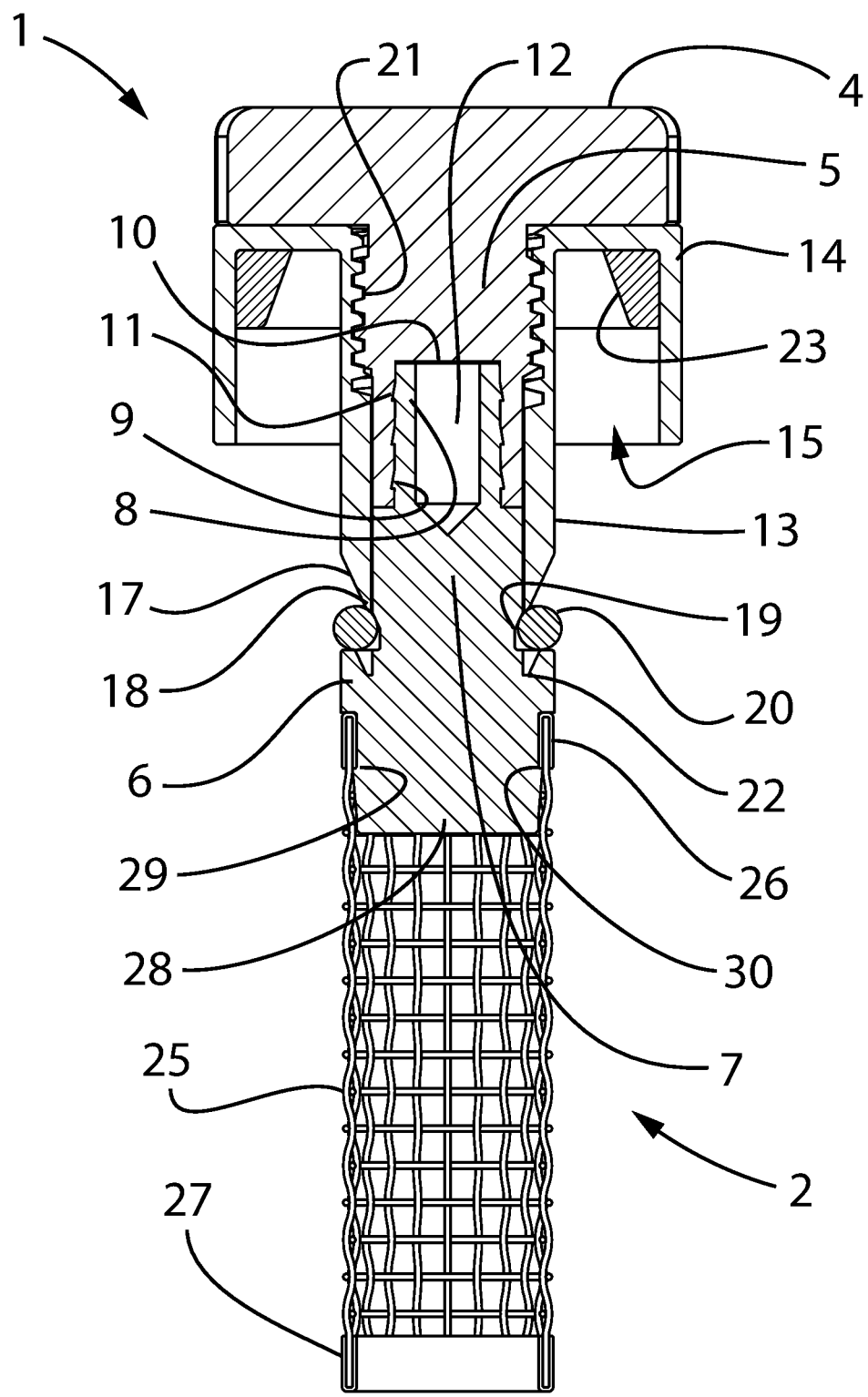
FIG. 3 is a vertical-section view of the bottle-sealing and preservation device of FIG. 2.
Figure 4:
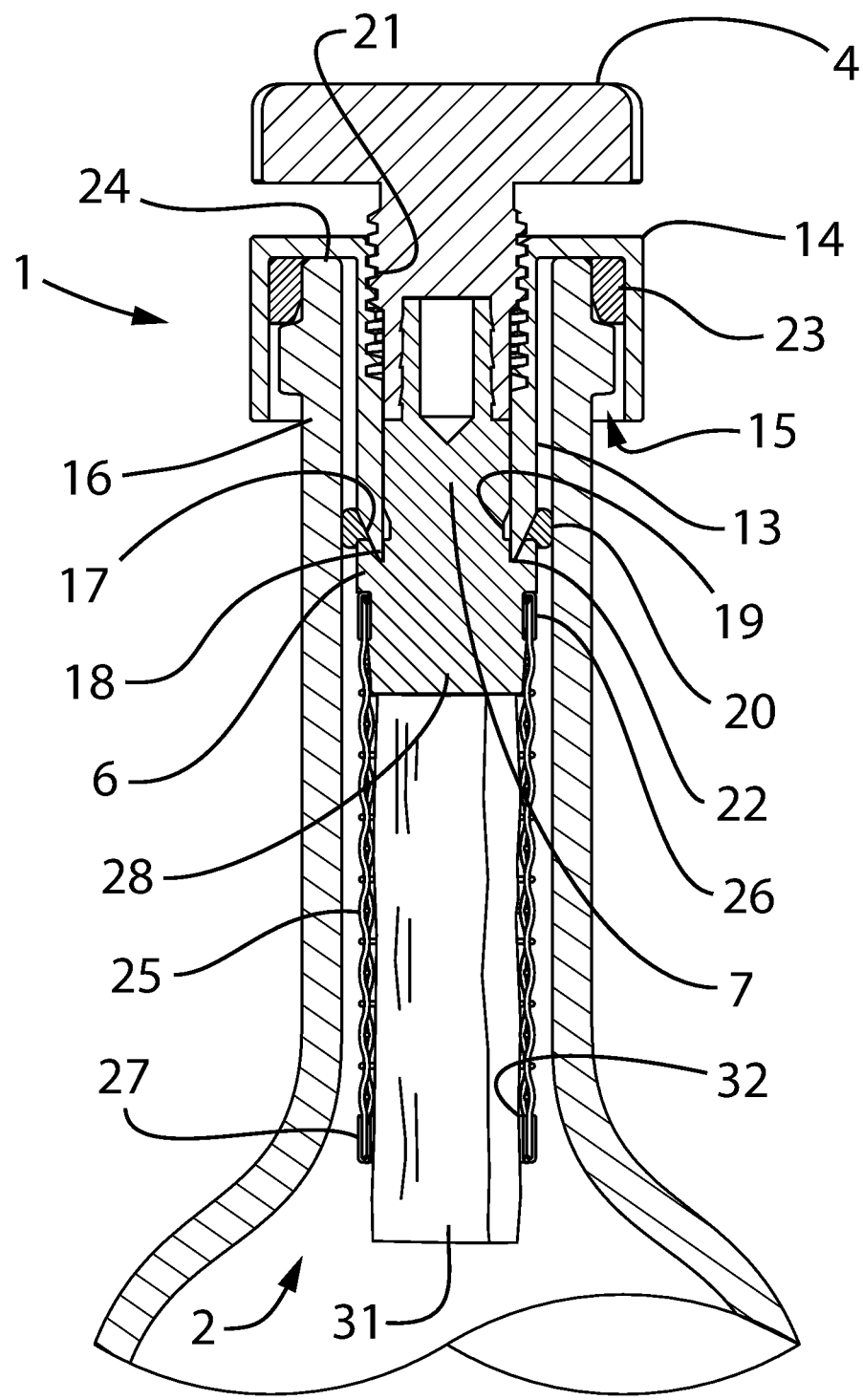
FIG. 4 is a vertical-section view of the bottle-sealing and preservation device of FIG. 3 affixed to a bottle with an oxygen-scavenging sachet having been installed.
Figure 5:
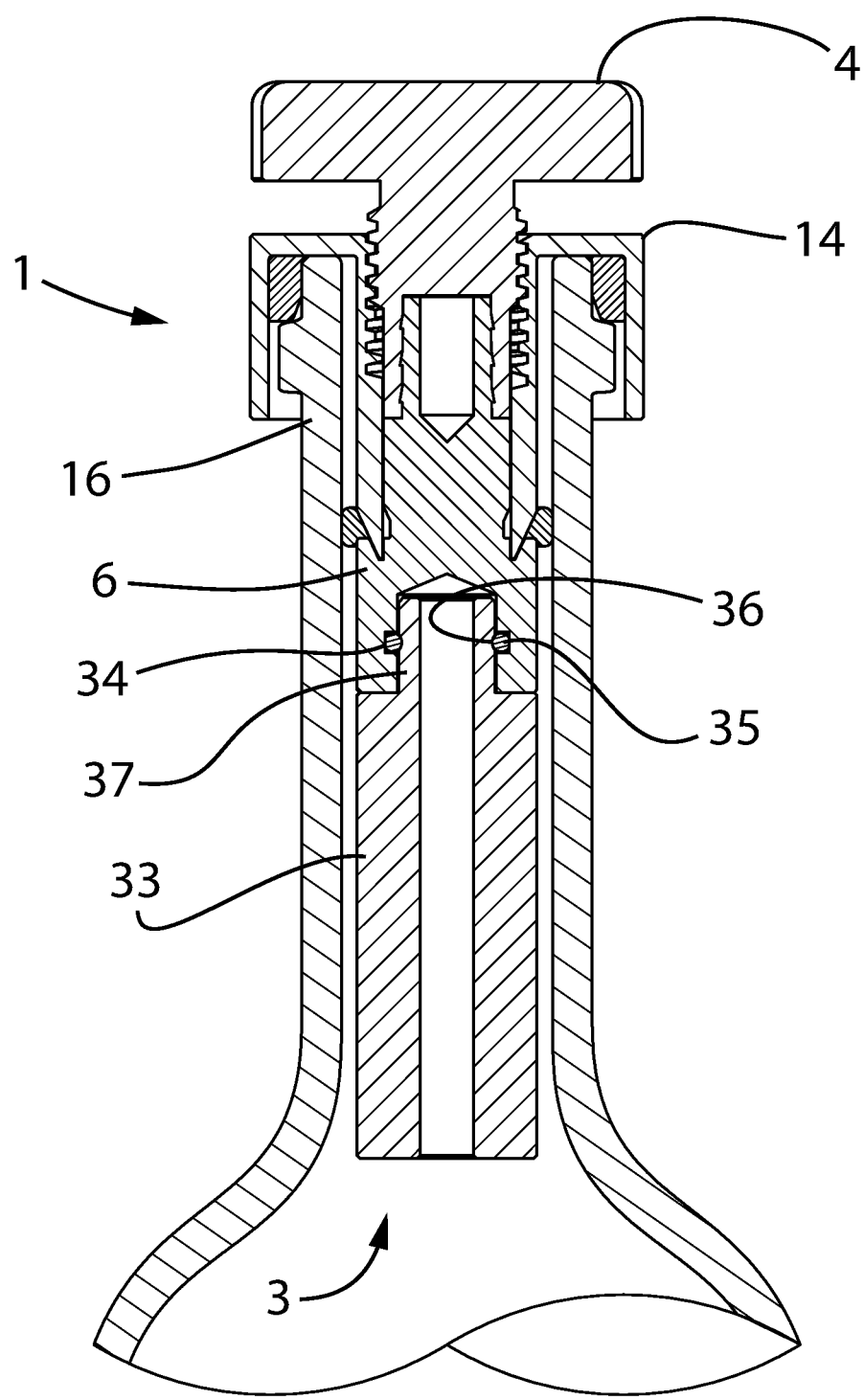
FIG. 5 is a view in perspective of a bottle-sealing and preservation device with an alternative preservation means.

Referring to FIGS. 1-5, bottle-sealing device 1 provides for the sealing of a variety of necked bottles—bottles under pressure such as sparkling wines, wine bottles, whiskey bottles, and screw-capped bottles. Referring to FIGS. 2-4, bottle-sealing device 1 may be configured with preservation means 2. FIG. 5 shows an alternate preservation means 3.

Referring to FIG. 3, the device includes a knob 4 that reduces to shaft 5 and a pusher ring 6 that also reduces to a similar shaft 7, with shafts 5 and 7 being joined via tapered press fit. Shaft 7 has male taper 8 with a series of barbs 9. Male taper 8 is sealably pressed in tapered hole 10 in shaft 5 that has a matching series of annular grooves 11, such that barbs 9 interlock in annular grooves 11. This tapered press fit with barbs allows a strong, reliable, air-tight, and easily executed attachment between two metal, two plastic, or combined metal and plastic parts without the need for adhesives or bonding techniques such as friction welding.

Drilled in male taper 8 is hole 12 that allows male taper 8 to yield a small amount as its quickly snapped into tapered hole 10. Notice that hole 12 is not drilled all the way through as pusher ring 6 must encapsulate the bottle contents.

Sandwiched between knob 4 and pusher ring 6 is outer shaft 13, rotatably mounted on joined shafts 5 and 7. Integral with the outer shaft 13 is grip sleeve 14 that sits below knob 4. Grip sleeve 14 has a cavity 15 that shrouds bottle neck 16, as shown in FIG. 4, providing ample surface area to apply torque with ones fingers.

Cut in the distal end of outer shaft 13 is frustoconical wedge 17 that comes to knife edge 18. Cut into shaft 7 is annular groove 19 on which resilient O-ring 20 is installed. The depth of annular groove 19 and the cross-sectional diameter of O-ring 20 are configured such that knife edge 18 engages the inner toroidal surface of O-ring 20 lifting it out of annular groove 19.

Outer shaft 13 is threadably attached to shaft 5 via left-hand threads 21 where turning knob 4 to the right—the typical tightening direction for threaded closures—causes knob 4 to advance away from grip sleeve 14. As pusher ring 6 is affixed to knob 4, it moves in concert, urging O-ring 20 towards knife edge 18 and up frustoconical wedge 17 where it expands and compresses against the inner surface of bottle neck 16, sealing thereto.

Annular groove 19 allows O-ring 20 to have a smaller outer diameter than it would otherwise—keeping all other geometry the same—which in turn expands the range of bottle neck 16 diameters that bottle-sealing device 1 can fit. At the low end of the range, are sparkling-wine bottles—Champagne, Prosecco, Sekt—that typically measure down to 0.685" for bottle neck 16 inner diameter (ID). Without annular groove 19, bottle-sealing device 1, with other parameters remaining static, would tend not fit most sparkling-wine bottles.

At the high end of the range are screw-capped bottles that measure up to 0.75" ID. To enable bottle-sealing device 1 to handle this larger neck size, pusher ring 6 includes annular recess 22 that mates with knife edge 18 when pusher ring 6 is fully advanced. This allows O-ring 20 to ride up the full length of frustoconical wedge 17, thereby maximizing its expansion.

Pressed in cavity 15 of grip sleeve 14 is resilient frustoconical seal 23 that mates with bottle mouth 24 of bottle neck 16 when bottle-sealing device 1 is affixed to a bottle as shown in FIG. 4. While inserting bottle-sealing device 1, frustoconical seal 23 functions as a cushion. Upon installation, frustoconical seal 23 stabilizes the device through tangential contact with bottle mouth 24. Without frustoconical seal 23 in place, bottle-sealing device 1 has only one point of attachment to bottle neck 16—O-ring 20, a largely unstable arrangement. Also, as knob 4 is tightened, friction between O-ring 20 and bottle neck 16 tends to pull frustoconical seal 23 down against bottle mouth 24 as O-ring 20 and frustoconical seal 23 are mechanically drawn toward each other, further stabilizing the device and providing a secondary seal in addition to O-ring 20.

Bottle-sealing device 1 may also include preservation means 2, as shown in FIGS. 2-4. Preservation means 2 is comprised of breathable cylindrical cage 25 and ferrules 26 and 27 that encapsulate the top and bottom edges of cylindrical cage 25, respectfully. As shown in FIG. 3, pusher ring 6 of bottle-sealing device 1 transitions into tapered post 28 on which ferrule 26 is snapped. Ferrule 26 is pressed onto tapered post 28 similar to the way that male taper 8 is pressed into tapered hole 10. Tapered post 28 has relief cut 29 that receives edge 30, snapping into place when ferrule 26 is bottomed out on tapered post 28.

FIG. 4 shows preservation means 2 with exemplary sachet 31 having been inserted. Sachet 31 typically comes in the form of a small thin rectangle, which in this case, is rolled into a tube and inserted in cylindrical cage 25. Sachet 31, with a gas-permeable wrapper, contains oxygen-scavenging chemicals such as iron powder that immediately start absorbing any oxygen in the surrounding atmosphere. This presumes that sachet 31 was packaged in a non-oxidizing atmosphere or vacuum prior to use.

Ferrule 27 has a rounded opening that facilitates easy insertion of sachet 31. The length of cylindrical cage 25 is configured to allow a portion of sachet 31 to stick out, facilitating its removal. Friction between cylindrical cage 25 and sachet 31, which wants to unroll to a certain extent, along with edge 32 of ferrule 27, keeps sachet 31 securely in place.

To preserve a bottle of wine or other oxidizable liquid, sachet 31 is removed from its packaging, rolled and inserted in cylindrical cage 25. Bottle-sealing device 1 (with sachet 31 in place) is secured to the bottle. Ideally, scavenging chemicals in sachet 31, which have already started to react with ambient oxygen, react with oxygen in the bottle faster than the rate of oxidation of said perishable liquid. Further, the drop in the partial pressure of oxygen will tend to cause any dissolved oxygen in the liquid to come out of solution, where it may react with the chemicals in sachet 31.

Oxygen-scavenging sachets have been known for some time and can typically reduce oxygen levels to 0.01% in the surrounding atmosphere, which is better than conventional vacuum or inert-gas displacement systems that typically reduce oxygen levels to 0.3-3%. A key advantage of oxygen scavenging over vacuum or inert-gas displacement is the ability to continually reduce oxygen levels as oxygen comes out of solution or leaks into the vessel. Any leaking, however, could easily overwhelm the scavenger undermining its effectiveness. The seal, compressed through mechanical advantage, provided by bottle-sealing device 1, materially eliminates oxygen ingress allowing sachet 31 to scavenge oxygen at the maximum-possible rate.

In addition to seal integrity, another key parameter determining the effectiveness of sachet 31 is the probability of the scavenger chemicals therein intercepting an oxygen molecule. Cylindrical cage 25 and sachet 31 hang down into the bottle headspace in good communication with the bottle atmosphere. In the preferred embodiment, cylindrical cage 25 is fabricated with 0.5 mm wire and configured with 2 mm openings, providing largely unimpeded access to oxygen molecules bouncing around the headspace.

While preservation means 2 represents the lowest-cost solution and the preferred embodiment, preservation means 3 is an alternative embodiment, shown in FIG. 5, where oxygen-scavenging chemicals are contained in cartridge 33 vs. sachet 31. In this embodiment, pusher ring 6 includes gland 34 containing resilient O-ring 35 that removably engages annular detent 36 of post 37 integral with cartridge 33. Like sachet 31, cartridge 33 contains oxygen-scavenging chemicals and is permeable to gas molecules. Because of its increased packaging thickness as compared to the optimally thin wrapping of sachet 31, the probability of the contents of cartridge 33 intercepting an oxygen molecule is lower than that of sachet 31. This, on top of added complexity and cost, leave cartridge 33 as the less attractive approach.

Figure 6:
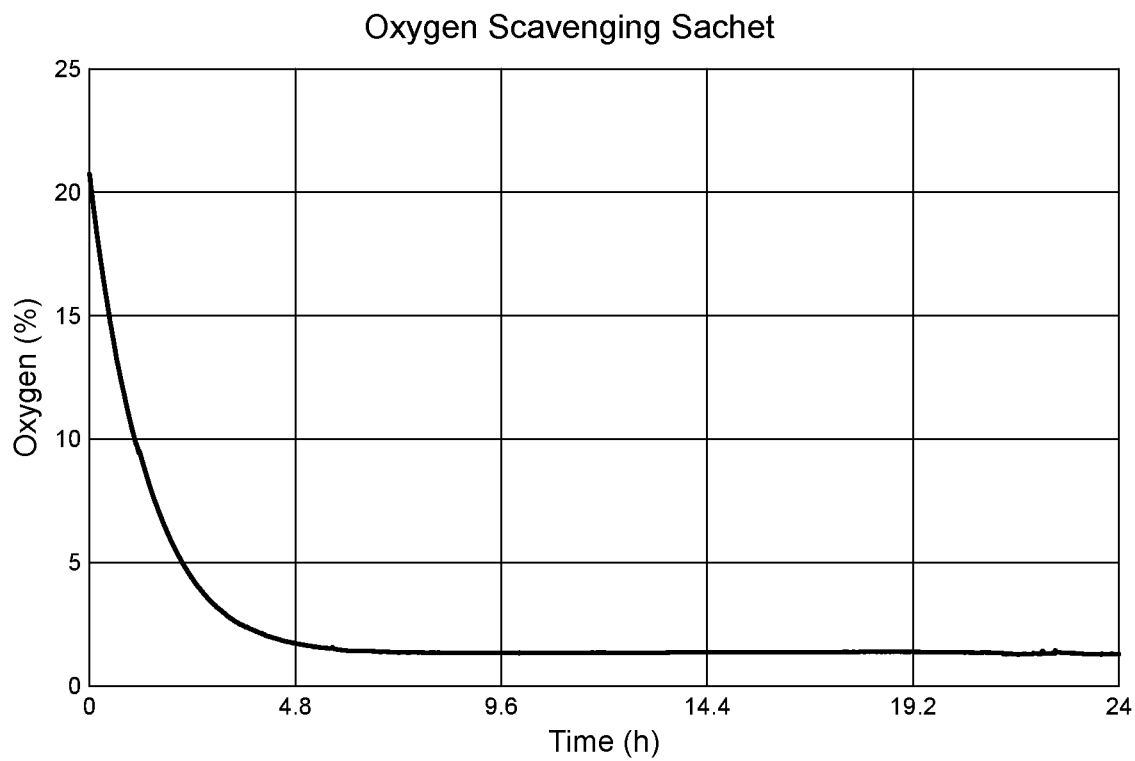
FIG. 6 is a graph of oxygen percentage vs. time in 375-ml container containing an exemplary oxygen-scavenging sachet.

FIG. 6 shows the rate at which exemplary sachet 31 reduces the oxygen percentage in the atmosphere of a 375 ml container, which simulates a standard 750 ml wine bottle being half full. As the graph shows, the oxygen percentage is reduced from its atmospheric fraction of 21% to 5% in about 45 min. and to 1% in about 5 hrs., which is essentially the graph's asymptote. Given the meter's tolerance, however, the actual percentage at this lower limit could be lower.

Figure 7:
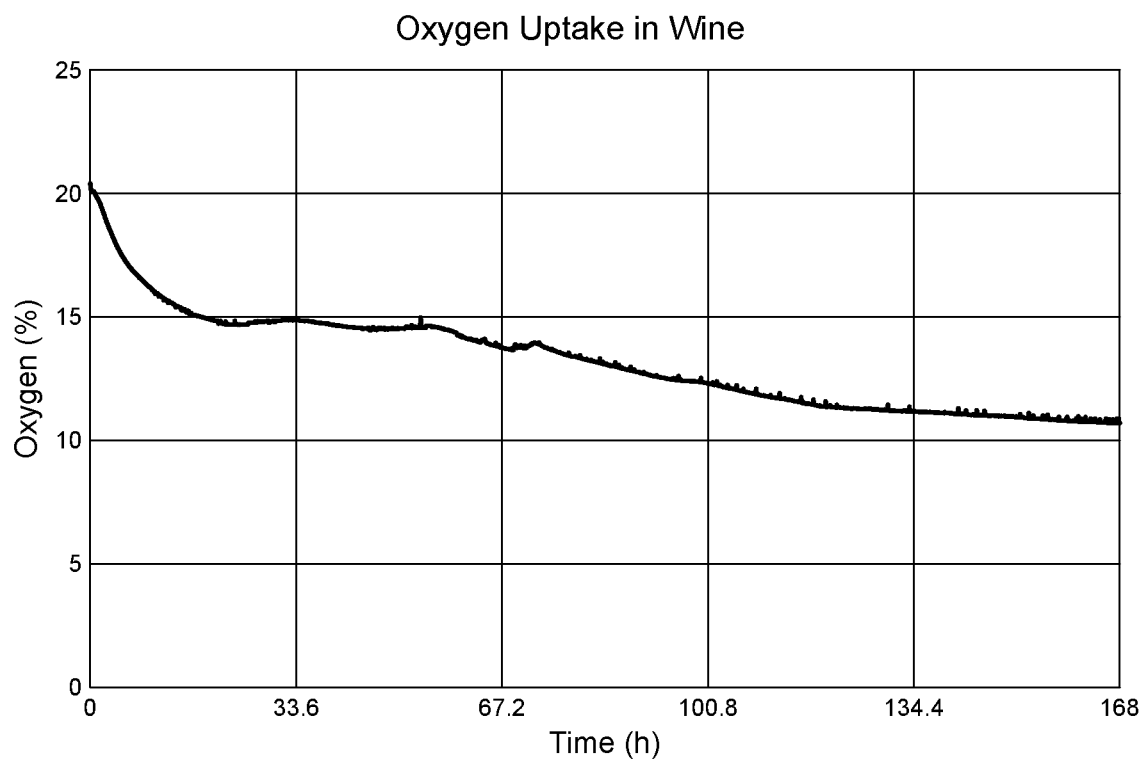
FIG. 7 is a graph of oxygen percentage vs. time in a 750-ml bottle containing 375 ml of white wine.

FIG. 7 shows the rate at which oxygen levels decline in the headspace of a 750 ml bottle of wine with half the contents having been dispensed. At the 45-min. mark, the oxygen percentage has dropped to 19%, showing the rate of uptake for sachet 31 to be significantly faster than rate of uptake for the wine. Upon opening a bottle of wine and dispensing a certain amount, atmospheric oxygen introduced in the bottle will dissolve into solution at a faster rate than reactions with wine materials, which, depending on the compounds in question and temperature, can take days to weeks. This can be seen in FIG. 7 where there is a steep decline in oxygen levels, marking the initial dissolution phase, followed by a much slower dissolution rate, where the rate at which oxygen entering solution matches the rate at which it reacts with wine materials. Ultimately, this allows sachet 31 to pull oxygen out of solution, through the continuous lowering of oxygen partial pressure in the headspace, before it can react with the wine.

What is claimed:

1. A hermetical bottle-neck closure, comprising:
   a knob sealably secured to a pusher ring through a shaft;
   a frustoconical wedge, sandwiched between said knob and said pusher ring, threadably attached to said shaft such that rotation of said knob axially advances said pusher ring toward said frustoconical wedge;
   a grip sleeve integral with or attached to said frustoconical wedge that is easily grasped to counter torque imparted to said knob;
   an O-ring that mates with said pusher ring and said frustoconical wedge, wherein said O-ring is stretched radially outward as said pusher ring urges said O-ring up said frustoconical wedge such that said O-ring is compressed against an inner surface of a bottle neck, sealing thereto.

2. A hermetical bottle-neck closure as in claim 1, wherein said grip sleeve contains a stabilizing ring with a frustoconical surface that mates with a bottle mouth.

3. A hermetical bottle-neck closure as in claim 2, wherein said stabilizing ring is elastomeric and/or resilient.

4. A hermetical bottle-neck closure as in claim 1, wherein said frustoconical wedge is threadably attached to said shaft via left-handed threads such that turning said knob to the right, advances said knob away from said grip sleeve and advances said pusher ring toward said frustoconical wedge, thereby compressing said O-ring against said bottle neck.

5. A hermetical bottle-neck closure as in claim 1, further comprising a small-radius edge in said frustoconical wedge and an annular recess in said shaft into which said O-ring can sit, wherein said small-radius edge slides under said O-ring as it is urged axially by said pusher ring, said annular recess allowing the outer diameter of said O-ring to be reduced in the minimal-diameter state.

6. A hermetical bottle-neck closure as in claim 1, wherein said knob and said pusher ring are sealably attached via tapered press fit, said knob having a frustoconical surface that mates with a frustoconical surface in said pusher ring, with said pusher-ring frustoconical surface having integral barbs that interlock with annular grooves in said knob frustoconical surface.

7. A hermetical bottle-neck closure as in claim 1, further comprising a cage or mesh that is either fixed or removably attached to said pusher ring, said cage extending down into said bottle neck, with the distal end of said cage open such that a sachet or other suitable container of chemicals may be removably inserted and held fast by the friction of said cage.

8. A hermetical bottle-neck closure as in claim 7, wherein said cage has a top ferrule and said pusher ring has a post with a frustoconical surface on to which said top ferrule may be pressed, with said post also having a relief cut wherein the inner edge of said top ferrule snaps into said relief cut upon being pressed a certain distance, thereby locking said top ferrule and said cage on to said post.

9. A hermetical bottle-neck closure as in claim 7, wherein said cage has a bottom ferrule at the distal open end that facilitates the insertion of said sachet with said bottom ferrule having an inner edge that helps keep said sachet frictionally in place.

10. A hermetical bottle-neck closure as in claim 7, wherein said sachet contains an oxygen-scavenging means and wherein said sachet is permeable to oxygen.

11. A hermetical bottle-neck closure as in claim 7, wherein said sachet may be rolled into a cylindrical form that can be removably inserted into said cage where the tendency of said cylindrical form to unroll may increase the friction between said sachet and said cage.

12. A hermetical bottle-neck closure as in claim 7, wherein the length of said cage is such that a portion of said sachet protrudes from said distal open end of said cage when fully inserted to facilitate easy removal thereof.

13. A hermetical bottle-neck closure as in claim 1, wherein said pusher ring has an attachment means allowing a cartridge containing chemicals to be removably attached thereto.

14. A hermetical bottle-neck closure as in claim 13, wherein said cartridge-attachment means comprises an O-ring in a gland that removably engages a post integral with said cartridge where said post may or may not have a groove that engages said O-ring.

15. A hermetical bottle-neck closure as in claim 13, wherein said cartridge contains an oxygen-scavenging means with said cartridge being permeable to oxygen.

16. A preservation device for a bottle comprising:
    a bottle stopper means with an attachment means for a breathable cage or mesh that extends down into said bottle, with the distal end of said cage open such that a sachet or other suitable container of chemicals may be removably inserted and held fast by the friction of said cage;

a bottom ferrule at the distal open end of said cage that facilitates the insertion of said sachet with said bottom ferrule having an inner edge that helps keep said sachet frictionally in place.

17. A preservation device as in claim 16, wherein said sachet contains an oxygen-scavenging means and wherein said sachet is permeable to oxygen.

18. A preservation device as in claim 16, wherein said sachet may be rolled into a cylindrical form that can be removably inserted into said cage where the tendency of said cylindrical form to unroll may increase the friction between said sachet and said cage.

19. A preservation device as in claim 16, wherein the length of said cage is such that a portion of said sachet protrudes from said distal open end of said cage when fully inserted to facilitate easy removal thereof.

* * * * *